UNITED STATES PATENT OFFICE.

RAYMOND B. PRICE, OF NEW YORK, N. Y.

METHOD OF MAKING VULCANIZED-RUBBER PRODUCTS.

1,152,838.     Specification of Letters Patent.     Patented Sept. 7, 1915.

No Drawing.     Application filed March 18, 1914. Serial No. 825,508.

*To all whom it may concern:*

Be it known that I, RAYMOND B. PRICE, a citizen of the United States, and a resident of New York, county and State of New York, have invented certain new and useful Improvements in Methods of Making Vulcanized-Rubber Products, of which the following is a full, clear, and exact description.

My invention relates to a new and useful art or method of making vulcanized rubber products and more particularly to rubber products made from thin sheets or strips of a rubber compound.

In the description of my invention, I shall refer more particularly to the practice of my art or method in connection with the production of rubber threads, as the conditions present in such, make the application of my improved art or method thereto especially advantageous.

At the present time rubber threads are made by forming a thin sheet of the unvulcanized rubber compound, placing a fabric sheet of fine texture thereupon and rolling the same tightly about a core and upon itself, so as to have said textile presented to both sides of the sheet of rubber. When completely wound, the roll is inclosed in outer windings of fabric, or other fibrous material, which is secured in position thereon so as to prevent the swelling, or other displacement, of the rubber during the time when the roll is subjected to the action of the vulcanizing medium. After vulcanization, the roll is unrolled and the fabric and vulcanized rubber separated, the latter being then cut into strips of the desired width. While by this method the rubber can be successfully vulcanized and the threads conveniently produced therefrom, the tendency of the rubber to swell during vulcanization develops additional internal pressure within the roll which, with the flowing of the rubber, brings the rubber into intimate engagement with the fabric and impresses the design of the fabric upon the rubber. This condition results in the formation of threads having two sides so roughened by reason of the design of the fabric thereon, as to impart certain undesirable properties to the finished product, and make it difficult to use the same in those arts for which this product is intended for use. Not only do the roughened surfaces increase the superficial area of each thread and thus increase the deleterious action of the light and air on the thread, particularly when under stretch, but when the threads are being woven into fabric, the tendency toward abrasion is material. With these conditions in mind, I contemplate the production of rubber products, formed from thin sheets or strips, in a manner which will impart to, or preserve in, the vulcanized sheet, opposite surfaces which will be perfectly smooth and free from those irregularities resulting from the impression of the design of a textile or other fibrous material thereon.

By my improved art or method, I am enabled to entirely dispense with textile materials during vulcanization and to avoid all of the objections growing out of the use of the same.

The invention consists primarily in a method of making vulcanized rubber products consisting in superimposing upon each other a number of layers of unvulcanized rubber compound having a coating or film of a non-fibrous medium thereon, said coating being between adjacent layers, whereby adhesion of the rubber of one layer to that of the adjacent layers is prevented, and subjecting the pile to the action of a vulcanizing medium; and in such other novel steps and practices as are hereinafter set forth and described and more particularly pointed out in the claims hereto appended.

In the practice of my invention, I use a thin sheet of unvulcanized rubber compound, produced by means of a calender or in any other desired manner, and apply to either the top or bottom surface thereof, or to both, a thin coating or film of a medium which even at the vulcanizing temperature, will keep the several layers of rubber distinct, and will prevent them from forming a solid, homogeneous mass. This coated strip is then rolled upon a cylindrical core, and upon itself, forming a plurality of superimposed layers, separated by the neutral medium. When the pile is so formed, I confine the same by an external jacket so that during the vulcanization, any substantial distortion or expansion thereof is prevented. If it be found that the core, or the inclosing jacket leaves an impression upon a portion of the strip, said core may be provided with a facing of a substance, such as sheet-lead, the texture of which presents substantially no design and the said jacket may be made of the same, or similar material. Instead of forming the pile as a roll, the superimposed layers may consist of a succession of separate sheets placed one upon the other, the successive sheets being coated in the manner above referred to, to prevent both the formation of a design upon the surface, and adhesion between adjacent sheets during the vulcanization thereof.

In actual practice, I have found glycerin to be highly satisfactory for use in practising my invention, as it has the property of flowing readily over the surface of the rubber; it possesses sufficient cohesion to permit the formation of a thin, continuous film of fairly uniform depth upon the surface thereof, and it does not permit adjacent layers of rubber to adhere. Glycerin, diluted with water, has also given satisfactory results, while water alone has been used with a degree of success to demonstrate its applicability under certain conditions to use in the practice of my method or art.

The manner of applying the material of the coating or film to the unvulcanized sheet or strip is immaterial to my invention so long as a substantially uninterrupted or continuous surfacing of the sheet or strip results. A suitable coating or film may be secured by submerging or dipping the sheet or strip in the material; by applying the material in comminuted form to the surface of the sheet or strip with or without subsequent dispersion or smoothing; by applying the material with a brush; by flowing the material over the surface or in any other desired manner.

The use of comminuted material as a separating medium, as, for instance, powdered soapstone, is objectionable on account of a portion of it intermixing with the rubber, thereby increasing the gravity of the compound. Powdered soapstone and various other materials may however, be used with beneficial results when suitably mixed with glycerin, for when so mixed the tendency for the powder to enter the rubber is avoided.

After vulcanization the separate thicknesses or plies of rubber are separated, there being no tendency of adjacent thicknesses or plies to stick or adhere to one another.

Thread, or other rubber products, made by and in accordance with my improved art or method, will present no roughened surfaces, so that abrasion thereof in the loom or elsewhere, and the injurious effects of light and air, are minimized.

Having described my invention, what I desire to have protected by Letters Patent is:

1. A method of making vulcanized rubber products consisting in superimposing upon each other a number of layers of unvulcanized rubber compound having a coating of a medium which is liquid at the vulcanizing temperature, said coating being applied between adjacent layers, whereby adhesion of the rubber of one layer to that of its adjacent layers is prevented, and while so coated subjecting the pile to the action of a vulcanizing medium.

2. A method of making vulcanized rubber products consisting in applying a coating of a medium which is a liquid at the vulcanizing temperature to sheeted unvulcanized rubber compound, forming a pile consisting of a number of layers of said rubber with said medium between adjacent layers whereby the adhesion of the rubber of one layer to that of its adjacent layers is prevented, and while so coated subjecting the pile to the action of a vulcanizing medium.

3. A method of making vulcanized rubber products consisting in applying a coating of glycerin to sheeted unvulcanized rubber compound forming a pile consisting of a number of layers of said rubber with said medium between adjacent layers whereby the adhesion of the rubber of one layer to that of its adjacent layers is prevented, and then subjecting the pile to the action of a vulcanizing medium.

4. A method of making vulcanized rubber products consisting in applying a coating of a medium which is liquid at the vulcanizing temperature to a sheet of unvulcanized rubber compound, rolling said sheet upon itself to form a number of superimposed layers with the said coating between adjacent layers, whereby the adhesion of the rubber of one layer to that of its adjacent layers is prevented, confining said roll with an external jacket, and then subjecting the roll to the action of a vulcanizing medium.

5. A method of making vulcanized rubber products consisting in applying a coating of glycerin to a sheet of unvulcanized rubber compound, rolling said sheet upon itself to form a number of superimposed layers with the coating of glycerin between adjacent layers whereby the adhesion of the rubber of one layer to that of its adjacent layers is prevented, confining said roll with an external jacket, and then subjecting the roll to the action of a vulcanizing medium.

Signed at New York city, county and State of New York, this 11th day of March, 1914.

RAYMOND B. PRICE.

Witnesses:
JOHN J. CASEY,
CHARLOTTE M. SCHULE.